(12) United States Patent
Richards et al.

(10) Patent No.: US 10,274,728 B2
(45) Date of Patent: Apr. 30, 2019

(54) STACKED DISPLAY PANELS FOR IMAGE ENHANCEMENT

(71) Applicant: Facebook Technologies, LLC, Menlo Park, CA (US)

(72) Inventors: Evan M. Richards, Santa Clara, CA (US); Shizhe Shen, Santa Clara, CA (US); Atman Jacob Binstock, Seattle, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 41 days.

(21) Appl. No.: 15/158,365

(22) Filed: May 18, 2016

(65) Prior Publication Data

US 2016/0343315 A1 Nov. 24, 2016

Related U.S. Application Data

(60) Provisional application No. 62/162,931, filed on May 18, 2015.

(51) Int. Cl.
G09G 3/36 (2006.01)
G02B 27/01 (2006.01)
G09G 3/20 (2006.01)

(52) U.S. Cl.
CPC ............ G02B 27/017 (2013.01); G09G 3/20 (2013.01); G02B 2027/012 (2013.01); G09G 2300/023 (2013.01); G09G 2300/0452 (2013.01)

(58) Field of Classification Search
CPC . G09G 3/20; G09G 5/00; G02B 27/01; G02B 27/017; G06T 19/006; G06F 1/1616; G06F 1/1637; G06F 1/1647; G02F 1/1347
See application file for complete search history.

(56) References Cited

U.S. PATENT DOCUMENTS

| | | | | |
|---|---|---|---|---|
| 7,821,474 B2* | 10/2010 | Marcu | ...................... | G09G 3/20 345/4 |
| 8,164,598 B2* | 4/2012 | Kimpe | ..................... | G09G 3/20 345/629 |
| 8,427,393 B2* | 4/2013 | Nakazaki | ................. | G09G 5/00 345/5 |
| 8,552,924 B2* | 10/2013 | Ikeno | .................. | G02F 1/13471 345/4 |
| 8,912,984 B2* | 12/2014 | Prociw | ................. | G09G 3/3208 315/169.3 |
| 9,547,174 B2* | 1/2017 | Gao | ..................... | H04N 5/2258 |

(Continued)

Primary Examiner — Sardis F Azongha
(74) Attorney, Agent, or Firm — Fenwick & West LLP

(57) ABSTRACT

A head-mounted display (HMD) includes an electronic display element and an optics block. The electronic display element includes a plurality of display panels that together output image light. The plurality of panels including a first display panel and a second display panel. The first display panel includes a first plurality of sub-pixels that are separated from each other by a non-emission area. The second panel includes a second plurality of sub-pixels. The second display panel is positioned offset from the first display panel such that the second plurality of sub-pixels emit light through the non-emission area of the first display panel. The optics block configured to direct the image light to an exit pupil of the HMD corresponding to a location of an eye of a user of the HMD.

17 Claims, 7 Drawing Sheets

(56) References Cited

U.S. PATENT DOCUMENTS

| | | | |
|---|---|---|---|
| 2002/0105516 A1* | 8/2002 | Tracy | G06T 15/40 345/419 |
| 2005/0104801 A1* | 5/2005 | Sugiura | H01L 27/12 345/5 |
| 2008/0122865 A1* | 5/2008 | Vanmoor | G09G 3/003 345/619 |
| 2009/0146933 A1* | 6/2009 | Visser | G02F 1/134309 345/87 |
| 2012/0060089 A1* | 3/2012 | Heo | G06F 1/1647 715/702 |
| 2013/0106923 A1* | 5/2013 | Shields | G09G 3/3406 345/690 |
| 2014/0184669 A1* | 7/2014 | Oh | G09G 3/3208 345/694 |
| 2014/0292825 A1* | 10/2014 | Kim | G09G 3/003 345/690 |
| 2015/0228217 A1* | 8/2015 | Perdices-Gonzalez | G09G 3/348 345/5 |
| 2016/0170702 A1* | 6/2016 | Jiang | G02F 1/133528 345/618 |

* cited by examiner

STACKED DISPLAY PANELS FOR IMAGE ENHANCEMENT

CROSS-REFERENCE TO RELATED APPLICATIONS

This application claims the benefit of prior co-pending U.S. Provisional Patent Application No. 62/162,931, filed May 18, 2015, the disclosure of which is hereby incorporated by reference in its entirety.

BACKGROUND

The present disclosure generally relates to enhancing images from electronic displays, and specifically to using stacked display panels for image enhancement.

Electronic displays include a plurality of pixels, which may each include a plurality of sub-pixels (e.g., a red sub-pixel, a green sub-pixel, etc.). Arrangement of individual sub-pixels may affect the appearance and performance of an electronic display device. A sub-pixel includes both an emission area and a non-emission area, and the fill factor of the sub-pixel describes the ratio of light emission area versus total area of the sub-pixel. The non-emission areas thus limit the fill factor of each sub-pixel. Additionally, some arrangements of sub-pixels may increase fixed pattern noise under certain conditions. For example, magnification of a pixel may result in non-emission areas between individual sub-pixels of the pixel becoming visible to the user, resulting in a "screen door" pattern (i.e., an increase in fixed pattern noise) in an image presented to a user.

SUMMARY

A stacked electronic display element includes a plurality of display panels that together output image light. The plurality of panels including a first display panel and a second display panel. The first display panel includes a first plurality of sub-pixels that are separated from each other by a non-emission area. The second display panel includes a second plurality of sub-pixels. The second display panel is positioned offset from the first display panel such that the second plurality of sub-pixels emit light through the non-emission area of the first display panel. The stacked electronic display element may be used to, e.g., increase effective fill factor, increase resolution, present high dynamic range images, present three dimensional images, or some combination thereof.

In some embodiments, the stacked electronic display is part of a head-mounted display. The HMD includes an optics block configured to direct the image light to an exit pupil of the HMD corresponding to a location of an eye of a user of the HMD.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
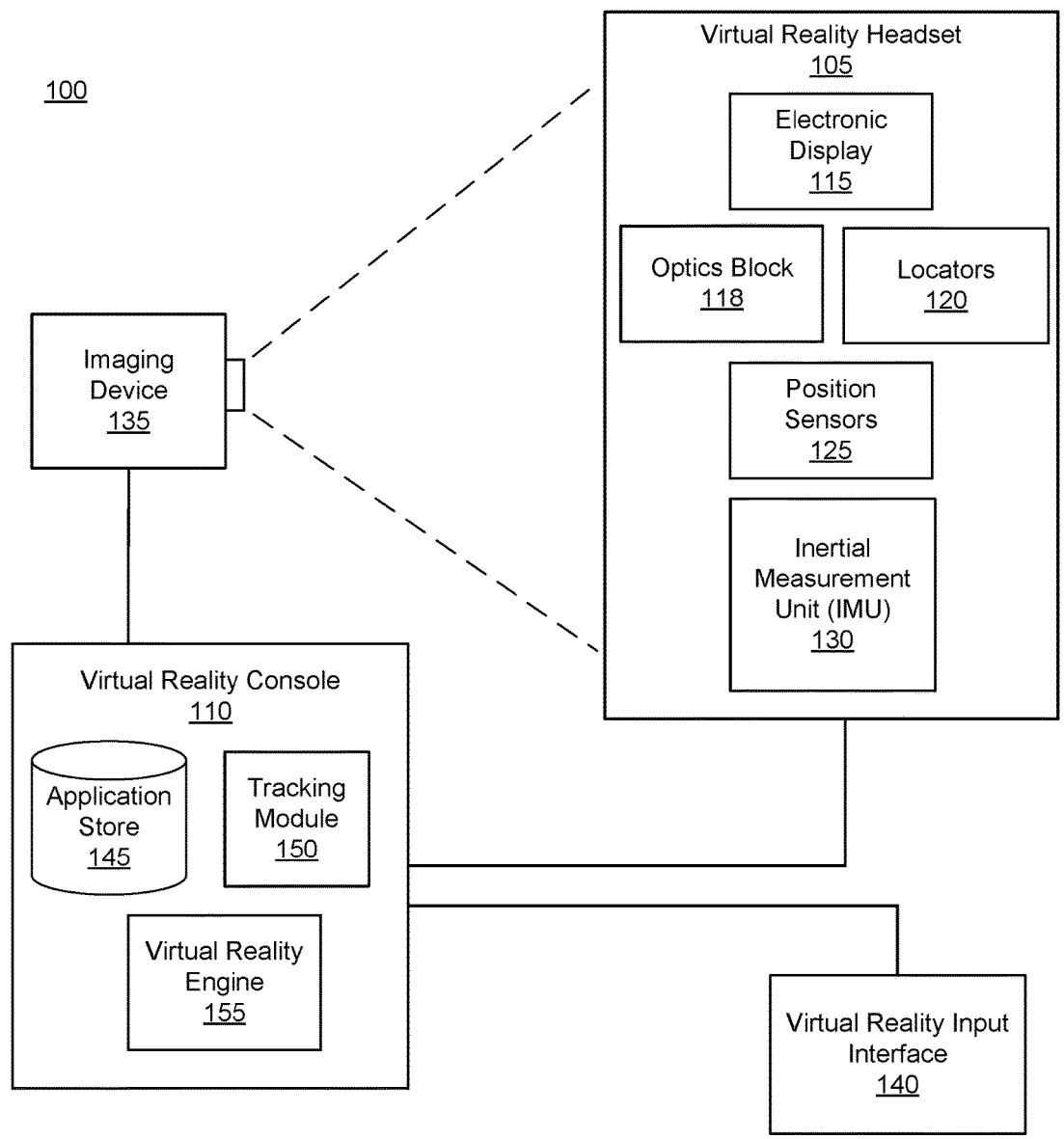
FIG. 1 is a block diagram of a system environment including a virtual reality system, in accordance with an embodiment.

FIG. 1 is a block diagram of a virtual reality (VR) system environment 100 in which a VR console 110 operates. The system environment 100 shown by FIG. 1 comprises a VR headset 105, an imaging device 135, and a VR input interface 140 that are each coupled to the VR console 110. While FIG. 1 shows an example system 100 including one VR headset 105, one imaging device 135, and one VR input interface 140, in other embodiments any number of these components may be included in the system 100. For example, there may be multiple VR headsets 105 each having an associated VR input interface 140 and being monitored by one or more imaging devices 135, with each VR headset 105, VR input interface 140, and imaging devices 135 communicating with the VR console 110. In alternative configurations, different and/or additional components may be included in the system environment 100.

The VR headset 105 is a head-mounted display that presents media to a user. Examples of media presented by the VR head set include one or more images, video, audio, or some combination thereof. In some embodiments, audio is presented via an external device (e.g., speakers and/or headphones) that receives audio information from the VR headset 105, the VR console 110, or both, and presents audio data based on the audio information. An embodiment of the VR headset 105 is further described below in conjunction with FIGS. 2A and 2B. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The VR headset 105 includes an electronic display 115, an optics block 118, one or more locators 120, one or more position sensors 125, and an inertial measurement unit (IMU) 130. The electronic display 115 displays images to the user in accordance with data received from the VR console 110. In various embodiments, the electronic display 115 may comprise a single stacked electronic display element or multiple stacked electronic display elements (e.g., a stacked electronic display element for each eye of a user).

A stacked electronic display element is a plurality of display panels that together output image light. As discussed in detail below, a stacked electronic display element may be used to enhance images in a plurality of ways (e.g., increase effective fill factor, increase resolution, present high dynamic range images, present three dimensional images, or some combination thereof). The stacked electronic display element includes at least a front display panel and a rear display panel, and in some embodiments may be separated by one or more intermediate components. The front display panel is a transparent electronic display panel. A transparent electronic display panel is partially or fully transparent and may be, for example, a transparent organic light emitting diode display (TOLED), some other transparent electronic display, or some combination thereof. An intermediate component may be a transparent electronic display panel, a film (e.g., attenuator, polarizer, diffractive, spectral, etc.), or some combination thereof. The rear display panel may be, e.g., a liquid crystal display (LCD), an organic light emitting diode (OLED) display, an active-matrix organic light-emitting diode display (AMOLED), a TOLED, some other display, or some combination thereof.

The display panels are stacked such that image light emitted from the rear display panel passes through any intermediate components and the front display toward the optics block 118. Likewise any intermediate component that is a transparent electronic display panel emits image light that passes through the front display panel toward the optics block, and may additionally pass through other intermediate components prior entering the front display panel.

Each display panel in a stacked electronic display element includes a display area comprising a plurality of sub-pixels (e.g., transparent OLED (TOLED)), where a sub-pixel is a discrete light emitting component that is positioned in the emission layer. For example, a sub-pixel emits red light, yellow light, blue light, green light, white light, or any other suitable color of light. A sub-pixel includes both an emission area, and a non-emission area, and a fill factor of the sub-pixel describes the ratio of light emission area versus total area of the sub-pixel.

It is desirable to have a high fill factor as it reduces fixed pattern noise in a display area. The display area is a portion of the electronic display panel that is presented to the viewing user. As shown below with reference to FIG. 4A, the emission area is an area of the sub-pixel which emits light. The non-emission area is an area of the sub-pixel which does not emit light, and generally includes transistors, electrodes, etc., which belong to the structure of an electronic display panel and are not active emitters of light. Different sub-pixels are separated from each other by the non-emission areas (also referred to as dark spaces) of adjacent sub-pixels.

In some embodiments, the display panels in the stacked electronic display element are positioned such that there is no, negligible, or minimal overlap between emissions areas of different display panels. For example, the emission areas of a first electronic display panel that emits image light into an input surface of a second electronic display panel backfills some, or all of, the non-emission areas of the second electronic display panel with light emitted from the first electronic display panel. Accordingly, an effective area of emitted light relative to the total area of the sub-pixel is increased. This increases an effective fill factor of the stacked electronic display element and thereby reduces the screen door effect. An effective fill factor is a fill factor based on the aggregate emissions areas and non-emission areas of the electronic display panels in the stacked electronic display element. Accordingly, in the above manner, a stacked electronic display element results in a higher fill factor than conventional electronic displays, as discussed in detail below with regard to FIGS. 4A and 4B.

Moreover, in some embodiments, the stacked electronic display element has a higher resolution than a single electronic display element. For example, different signals may be provided to each of the electronic display panels in the stacked electronic display element in order to produce an aggregate image that has a higher resolution than an image produced by a single electronic display panel. An aggregate image is an image composed of image light emitted from different electronic display elements in the stacked electronic display element.

In some embodiments, the stacked electronic display element is configured to emit high dynamic range (HDR) images. The stacked electronic display element may be configured such that each electronic display panel within the stacked electronic display element outputs image light at different dynamic ranges, such that an aggregate image emitted by the stacked electronic display panel is a high dynamic range (HDR) image. For example, the front electronic display panel may be configured to drive the higher dynamic range of an image and the rear electronic display panel could drive the lower dynamic range of the image, resulting in an aggregate image that is an HDR image. Accordingly, in the above manner, a stacked electronic display may be configured to operate as a HDR display, as discussed in detail below with regard to FIGS. 5A and 5B.

In some embodiments, the stacked electronic display element is configured to emit three dimensional (3D) images. A typical electronic display emits images in two dimensions (e.g., x and y components in a Cartesian coordinate system), however, in contrast a 3D image also includes depth (e.g., a z component). The stacked electronic display element segments a total depth of a 3D image into different regions and assigns each segment to a different electronic display panel within the stacked electronic display element. As the electronic display elements are located at different positions in the stacked electronic display element, and emit image light corresponding to their assigned segment, the aggregate image emitted by the stacked electronic display element is a 3D image. Accordingly, in the above manner, a stacked electronic display may be configured to operate as a 3D display, as discussed in detail below with regard to FIGS. 6A-6C.

In some embodiments, images projected by the electronic display 115 are rendered on the sub-pixel level. This is distinct from, say an RGB (red-green-blue) layout, which has discrete red, green, and blue pixels (red, green, and blue) and each pixel in the RGB layout includes a red sub-pixel, which is adjacent to a green sub-pixel that is adjacent to a blue sub-pixel. The red, green, and blue sub-pixels operate together to form different colors. In an RGB layout a sub-pixel in a pixel is restricted to working within that pixel. However, in some embodiments, sub-pixels in the electronic display operate within multiple "logical" pixels in their surrounding vicinity to form different colors. The sub-pixels are arranged on the display area of the electronic display 115 in a sub-pixel array. Examples of a sub-pixel array include PENTILE® RGBG, PENTILE® RGBW, some another suitable arrangement of sub-pixels that renders images at the sub-pixel level.

The optics block 118 magnifies received light from the electronic display 115, corrects optical errors associated with the image light, and the corrected image light is presented to a user of the VR headset 105. An optical element may be an aperture, a Fresnel lens, a convex lens, a concave lens, a filter, or any other suitable optical element that affects the image light emitted from the electronic display 115. Moreover, the optics block 118 may include combinations of different optical elements. In some embodiments, one or more of the optical elements in the optics block 118 may have one or more coatings, such as anti-reflective coatings.

Magnification of the image light by the optics block 118 allows the electronic display 115 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. Magnification of the image light may cause an increase in fixed pattern noise, also referred to as the "screen door effect," which is a visual artifact where dark space separating pixels and/or sub-pixels of a display become visible to a user in an image presented by the display. However, as noted above, the stacked electronic display element in the electronic display 115 may be configured to such that electronic display panels backfill the dark spaces (non-emission areas) of other electronic display panels, thus reducing the screen door effect. In some embodiments, the dark spaces can effectively be reduced to zero. In some embodiments, the optics block 118 is designed so its effective focal length is larger than the spacing to the electronic display 115, which magnifies the image light projected by the electronic display 115. Additionally, in some embodiments, the amount of magnification may be adjusted by adding or removing optical elements.

The optics block 118 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, comatic aberration, field curvature, astigmatism, or any other type of three-dimensional optical error. In some embodiments, content provided to the electronic display 115 for display is pre-distorted, and the optics block 118 corrects the distortion when it receives image light from the electronic display 115 generated based on the content.

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 120 are located beneath an outer surface of the VR headset 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the VR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space; however, in practice the reference point is defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the VR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start or end an application or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action.

The VR console 110 provides media to the VR headset 105 for presentation to the user in accordance with information received from one or more of: the imaging device 135, the VR headset 105, and the VR input interface 140. In the example shown in FIG. 1, the VR console 110 includes an application store 145, a tracking module 150, and a virtual reality (VR) engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor, generates content for presentation to the user. Content generated by an application may be in response to inputs received from the user via movement of the HR headset 105 or the VR interface device 140. Examples of applications include: gaming applications, conferencing applications, video playback application, or other suitable applications.

The tracking module 150 calibrates the VR system 100 using one or more calibration parameters and may adjust one or more calibration parameters to reduce error in determination of the position of the VR headset 105. For example, the tracking module 150 adjusts the focus of the imaging device 135 to obtain a more accurate position for observed locators on the VR headset 105. Moreover, calibration performed by the tracking module 150 also accounts for information received from the IMU 130. Additionally, if tracking of the VR headset 105 is lost (e.g., the imaging device 135 loses line of sight of at least a threshold number of the locators 120), the tracking module 140 re-calibrates some or all of the system environment 100.

The tracking module 150 tracks movements of the VR headset 105 using slow calibration information from the imaging device 135. The tracking module 150 determines positions of a reference point of the VR headset 105 using observed locators from the slow calibration information and a model of the VR headset 105. The tracking module 150 also determines positions of a reference point of the VR headset 105 using position information from the fast calibration information. Additionally, in some embodiments, the tracking module 150 may use portions of the fast calibration information, the slow calibration information, or some combination thereof, to predict a future location of the headset 105. The tracking module 150 provides the estimated or predicted future position of the VR headset 105 to the VR engine 155.

The VR engine 155 executes applications within the system environment 100 and receives position information, acceleration information, velocity information, predicted future positions, or some combination thereof of the VR headset 105 from the tracking module 150. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

Figure 2A:
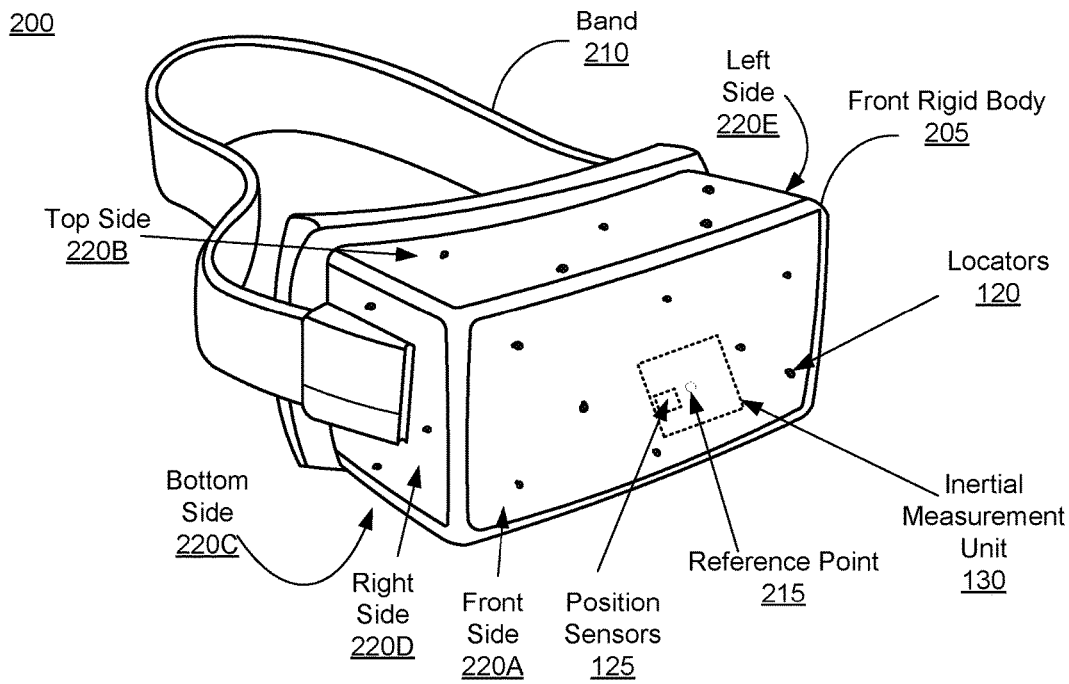
FIG. 2A is a diagram of a virtual reality headset, in accordance with an embodiment.

FIG. 2A is a diagram of a virtual reality (VR) headset, in accordance with an embodiment. The VR headset 200 is an embodiment of the VR headset 105, and includes a front rigid body 205 and a band 210. The front rigid body 205 includes one or more stacked electronic display elements of the electronic display 115 (not shown in FIG. 2A), the IMU 130, the one or more position sensors 125, and the locators 120. In the embodiment shown by FIG. 2A, the position sensors 125 are located within the IMU 130, and neither the IMU 130 nor the position sensors 125 are visible to the user.

The locators 120 are located in fixed positions on the front rigid body 205 relative to one another and relative to a reference point 215. In the example of FIG. 2A, the reference point 215 is located at the center of the IMU 130. Each of the locators 120 emit light that is detectable by the imaging device 135. Locators 120, or portions of locators 120, are located on a front side 220A, a top side 220B, a bottom side 220C, a right side 220D, and a left side 220E of the front rigid body 205 in the example of FIG. 2A.

Figure 2B:
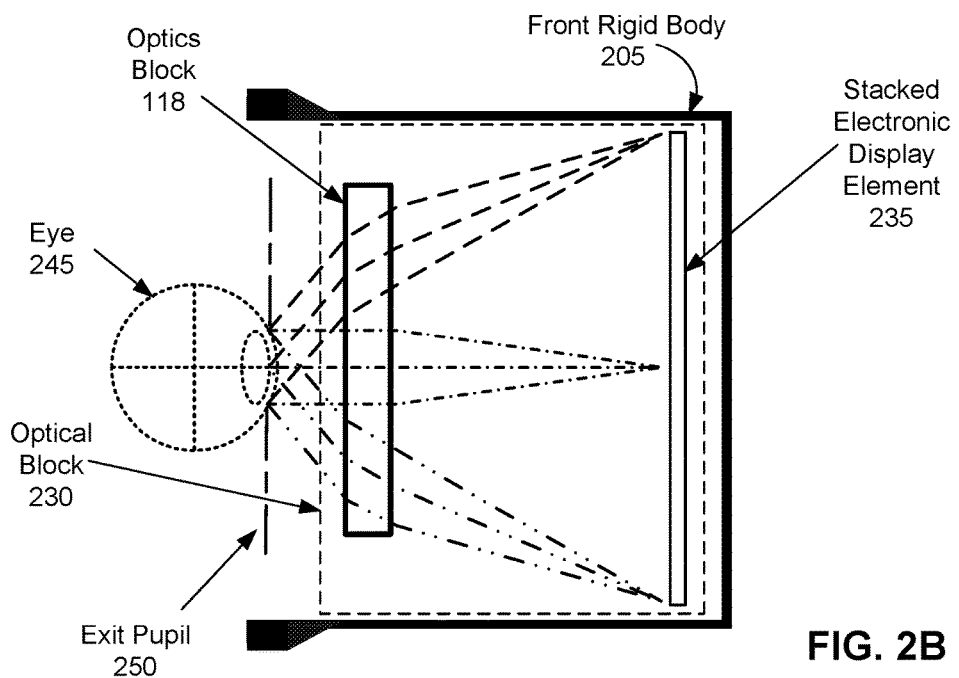
FIG. 2B is a cross section of a front rigid body of the VR headset in FIG. 2A, in accordance with an embodiment.

FIG. 2B is a cross section 225 of the front rigid body 205 of the embodiment of a VR headset 200 shown in FIG. 2A. As shown in FIG. 2B, the front rigid body 205 includes an optical block 230 that provides altered image light to an exit pupil 250. The exit pupil 250 is the location of the front rigid body 205 where a user's eye 245 is positioned. For purposes of illustration, FIG. 2B shows a cross section 225 associated with a single eye 245, but another optical block, separate from the optical block 230, provides altered image light to another eye of the user.

The optical block 230 includes a stacked electronic display element 235 of the electronic display 115, and the optics block 118. The stacked electronic display element 235 emits image light toward the optics block 118. The optics block 118 magnifies the image light, and in some embodiments, also corrects for one or more additional optical errors (e.g., distortion, astigmatism, etc.). The optics block 118 directs the image light to the exit pupil 250 for presentation to the user.

Figure 3:
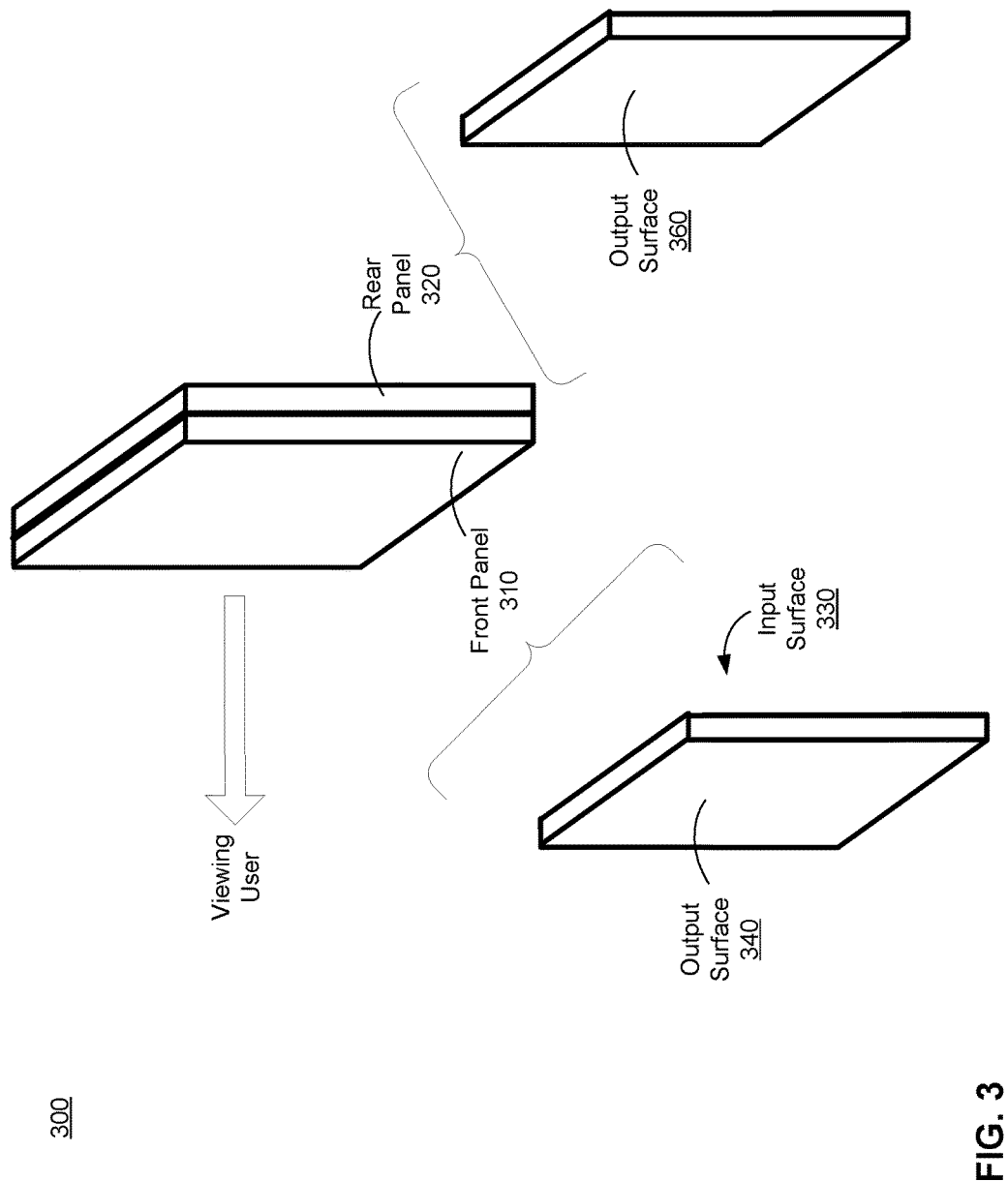
FIG. 3 is an example stacked electronic display element including two display panels, in accordance with an embodiment

FIG. 3 is an example stacked electronic display element 300 including two display panels, in accordance with an embodiment. In some embodiments, the stacked electronic display element 300 is part of the electronic display 115 of the VR headset 105 (e.g., stacked electronic display element 235). In other embodiments it is some other electronic display, e.g., a computer monitor, a television set, etc.

A stacked electronic display element 300 is a plurality of display panels that together output image light. The stacked electronic display element 300 includes a front electronic display panel 310 and a rear electronic display panel 320. The front electronic display panel 310 is a transparent electronic display panel. As discussed above with respect to FIG. 1, a transparent electronic display panel may be, for example, a TOLED, some other transparent electronic display, or some combination thereof. The rear electronic display panel may 320 may be, e.g., a LCD, an OLED, an AMOLED, a TOLED, some other display, or some combination thereof.

While the stacked electronic display element 300 includes two electronic display panels, in other embodiments, the stacked electronic display element 300 includes one or more intermediate components between the front panel 310 and the rear panel 320. An intermediate component may be a transparent electronic display panel, a film (e.g., attenuator, polarizer, diffractive, spectral, etc.), or some combination thereof.

The front electronic display panel 310 includes an input surface 330 (also referred to as a mounting surface) and an output surface 340 (also referred to as a display surface). The rear electronic display panel 310 includes an output surface 360 (also referred to as a display surface). The output surfaces 340, 360 each are configured to emit image light. In some embodiments, the image light output by each panel may be a same image light, but have the brightness adjusted to account for attenuation of image light resulting from the image light passing through the front panel 310 and any intermediate components. In other embodiments, the image light emitted from each electronic display panel may be different from image light emitted from other electronic display panels (e.g., to create aggregate images of increased resolution, high dynamic range, 3-D images, or some combination thereof). In some embodiments, the front electronic display panel 310 is affixed to the rear electronic display element 320. For example, the input surface 330 of the front electronic display panel 310 is affixed to the output surface 360 of the rear electronic display element 320 using a transparent adhesive. Alternatively the front electronic display panel 310 may be affixed the rear electronic display element 320 via a mechanical coupling.

Stacked Electronic Display Element Configured to Increase Fill Factor

Figure 4A:
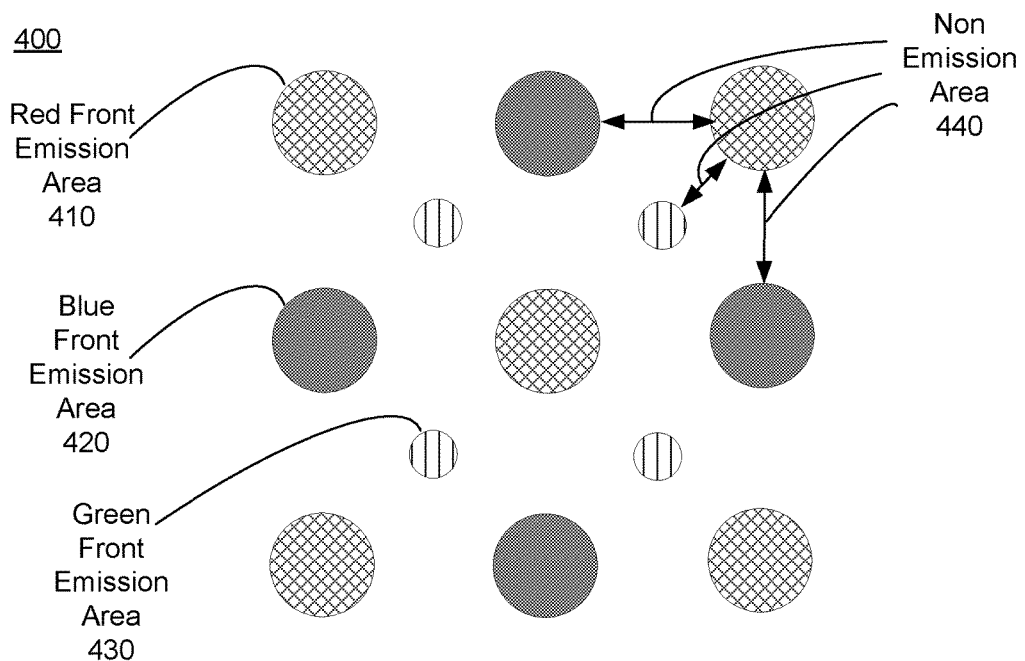
FIG. 4A is an example array of sub-pixel emission areas on a front electronic display panel of a stacked electronic display element.

FIG. 4A is an example array 400 of sub-pixel emission areas on a front electronic display panel (e.g., front electronic display panel 310) of a stacked electronic display element (e.g., stacked electronic display element 300). In some embodiments, the array 400 may be part of a stacked electronic display element of some other electronic display, e.g., a computer monitor, a television set, etc. The example array 400 shown in FIG. 4A includes emission areas 410, 420, and 430 for respectively, red sub-pixels, blue sub-pixels, and green sub-pixels. The emission areas 410, 420, 430 correspond to areas of the sub-pixels that actively emit light toward a viewing user. A non-emission area 440 separates the emission areas of each sub-pixel from one or more adjacent emission areas of other sub-pixels. The non-emission area 440 is a portion of the array 400 that does not emit light, and in conventional electronic displays may become visible to a user under certain circumstances (e.g., magnification), causing the screen door effect that degrades image quality.

Figure 4B:
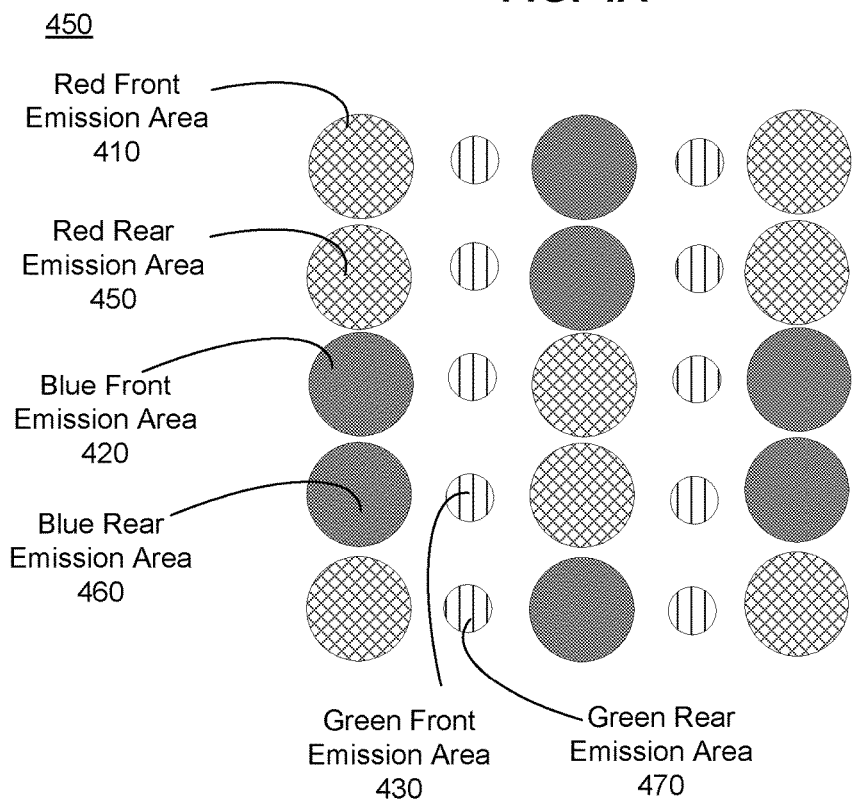
FIG. 4B is an example array of aggregate sub-pixel emission areas on a stacked electronic display panel.

FIG. 4B is an example array 450 of aggregate sub-pixel emission areas on a stacked electronic display panel (e.g., stacked electronic display element 300). In some embodiments, the array 450 may be part of some other electronic display, e.g., a computer monitor, a television set, etc. The example array 450 includes image light from the array 400 of sub-pixel emission areas on a front electronic display panel (e.g., front electronic display panel 310), as well as image light from sub-pixel emission areas from a rear electronic display panel (e.g., rear electronic display panel 320). The example array 450 shown in FIG. 4A includes emission areas 410, 420, and 430 for respectively, red sub-pixels, blue sub-pixels, and green sub-pixels of the front electronic display panel, and emission areas 450, 460, and 470 for respectively, red sub-pixels, blue sub-pixels, and green sub-pixels of the rear electronic display panel.

In FIG. 4B, the display panels are stacked such that the emission areas of the front electronic display panel are offset from the emission areas of the rear electronic display panel. The offset is such that image light emitted from the rear display panel passes through the non-emission areas 440 of the front electronic display to generate the example array 450. Accordingly, an effective area of emitted light relative to the total area of the sub-pixels is increased in the stacked electronic display element, and thereby increases an effective fill factor of the stacked electronic display element and reduces the screen door effect. Moreover, in some embodiments, the front electronic display panel and the rear electronic display panel may be configured to emit image light such that the aggregate image has a higher resolution than a single electronic display element.

Stacked Electronic Display Element Configured for High Dynamic Range Operation

Dynamic range describes a ratio between the maximum and minimum light intensities in an image, and may vary from image to image. In practice, it is difficult to achieve the full dynamic range experienced by humans using conventional electronic displays. Electronically reproduced images/video often adjust image data having a wide dynamic range to fit into a narrower recorded dynamic range that can be more easily displayed. For example, a scene showing an interior of a room with a sunlit view outside a window, for instance, will have a relatively high dynamic range (e.g., approximately 100,000:1). However, a typical LCD display has a dynamic range (e.g., commercially referred to as contrast ratio meaning the full-on/full-off luminance ratio) of around 1000:1, accordingly, in some situations the LCD is not able to present the entire dynamic range. Instead, when showing a movie, game, etc., a conventional electronic display is able to show both shadowy nighttime scenes and bright outdoor sunlit scenes, but uses cues to suggest night or day (e.g., a nighttime scene may usually contain duller colors, be lit with blue lighting which reflects the way that the human eye sees colors at low light levels, etc.).

A HDR (High Dynamic Range) image stores pixel values that span a range of light intensities that is greater than a range able to be displayed by a single electronic display element. A stacked electronic display element maybe configured to present a HDR image that is the aggregate of image light emitted from the front electronic display panel, the rear electronic display panel, and any additional display panels. The stacked electronic display element assigns different luminosity ranges to different electronic display panels. For example, the stacked electronic display may divide a total dynamic range of the HDR image into 'n' number of reduced dynamic ranges, where 'n' corresponds to the number of electronic display panels in the stacked electronic display element. A reduced dynamic range is a dynamic range associated with a single display panel (e.g., 1000:1). The stacked electronic display provides each display panel its respective reduced dynamic range, and they each display panel in the stacked electronic display emits portions of an image in accordance with its associated reduced dynamic range. Accordingly, the dynamic range of the stacked electronic display element scales with the number of electronic display panels within the stacked electronic display. For example, in some embodiments the stacked electronic display may contain three electronic displays, one of which could be configured to present high luminosity portions of an HDR image, another configured to present middle luminosity portions of the HDR image, and the remaining electronic display panel configured to present low luminosity portions of the HDR image.

Additionally, in some embodiments, the stacked electronic display element may include additional intermediate comments between a front electronic display panel and a rear electronic display panel that affect/enhance the image. For example, the stacked electronic display element may include one or more films (e.g., attenuator, polarizer, diffractive, spectral, etc.) between one or more electronic display panels.

Figure 5:
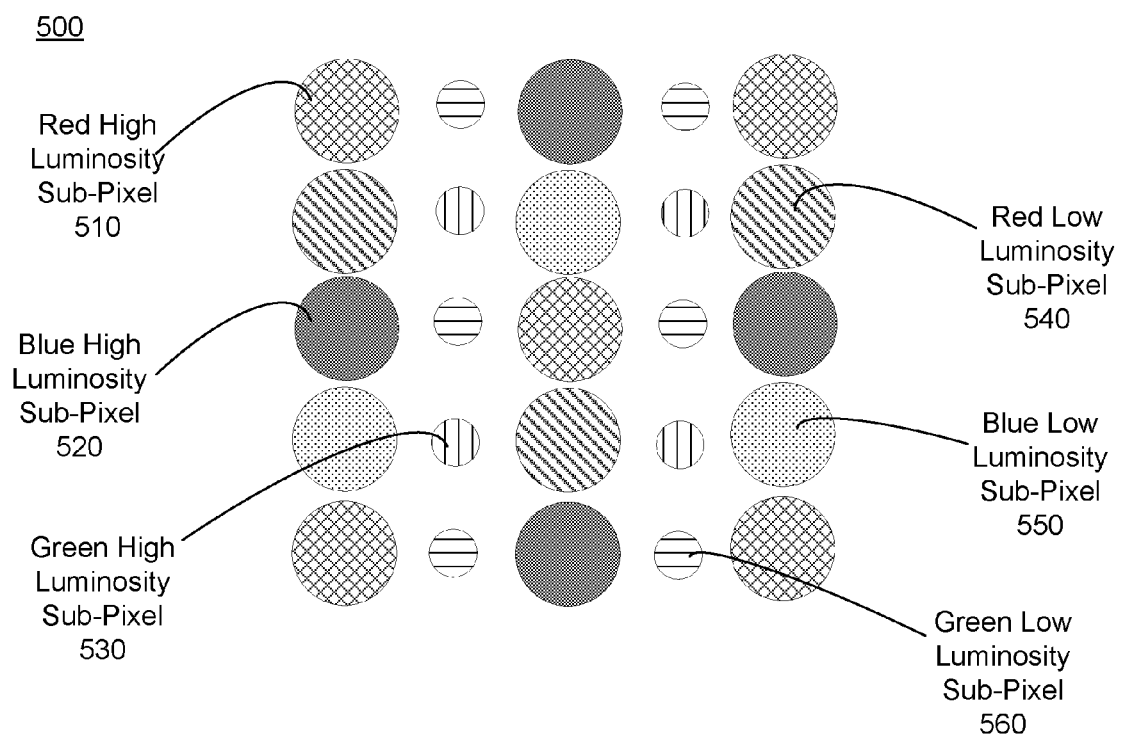
FIG. 5 is an example array of aggregate sub-pixel emission areas on a stacked electronic display element configured to operate as a high dynamic range display.

FIG. 5 is an example array 500 of aggregate sub-pixel emission areas on a stacked electronic display element (e.g., stacked electronic display element 300) configured to operate as an HDR display. In some embodiments, the array 500 may be part of some other electronic display, e.g., a computer monitor, a television set, etc. The example array 500 includes image light from an array of sub-pixel emission areas on a high luminosity electronic display panel (e.g., rear electronic display panel 320), as well as image light from sub-pixel emission areas from a low luminosity electronic display panel (e.g., front electronic display panel 310).

In this example, the stacked electronic display element includes two electronic display panels. One electronic display element presents low luminosity portions of the HDR image, and the other electronic display panel presents high luminosity portions of the HDR image. In this embodiment, high luminosity refers to a portion of the HDR image having a higher luminosity than a low luminosity portion of the HDR image. In some embodiments, the combination of the low luminosity and high luminosity portions of the image describe the luminosity of the entire HDR image.

The example array 500 shown in FIG. 5 includes emission areas 510, 520, and 530 for respectively, high luminosity red sub-pixels, high luminosity blue sub-pixels, and high luminosity green sub-pixels of the high luminosity electronic display panel, and emission areas 540, 550, and 560 for respectively, low luminosity red sub-pixels, low luminosity blue sub-pixels, and low luminosity green sub-pixels of the rear electronic display panel. Accordingly, the array 500 is able to present HDR images by effectively doubling the dynamic range that would otherwise be attributed to a single electronic display element.

In FIGS. 4A and 4B and 5, each panel has the same sub-pixel pattern. In alternate embodiments, complimentary sub-pixel patterns may be used on different display panels.

Stacked Electronic Display Element Configured for Presenting 3D Images

In some embodiments, the stacked electronic display element is configured to emit 3D images. As noted above, a typical electronic display emits 2-dimensional images (e.g., 'x' and 'y' components in a Cartesian coordinate system). In contrast a 3D image also includes depth (e.g., a range of 'z' values), which is not present in a 2-D image—where a user simply focuses on a single plane.

In some embodiments, a stacked electronic display element (e.g., stacked electronic display element 300) may be configured to present 3D images. For example, the stacked electronic display element may receive image data describing an image object for presentation to a user as a 3D image. The stacked electronic display element determines a total depth of the image object using the image data (e.g., determines a range of 'z' that describes the image object). The stacked electronic display element then segments the determined total depth of the image object into 'n' different, successive, regions, where 'n' is a number of electronic display panels in the stacked electronic display element. The regions are successive in the sense that $n_1$ describes a first portion of the image object, $n_2$ describes a next portion of the object, and so on for all the regions. For example, if the image object was of an inside of a room that has a total depth of 12 feet and the stacked electronic display element includes 6 electronic display elements, the stacked electronic display element would segment the total depth into 6 successive regions. Each region is associated with a range of depth values. For example, a first region (e.g., $n_1$) may be associated with $z_1$ to $z_2$, a second region (e.g., $n_2$) would be associated with $z_3$ to $z_4$, and so on, where $z_4 \geq z_3 \geq z_2 \geq z_1$, and the absolute depth describes the size of a region (i.e., $|z_2-z_1|$).

In some embodiments, an absolute depth of each region is the same. For example, an absolute depth for each region is the total depth divided by the number of electronic display panels. Continuing the example above, as the total depth is 12 feet and the number of electronic display panels is 6, each region would have an absolute depth of 2 feet (=12/6) at successive positions throughout the total depth of the image object. Alternatively, the absolute depth of one or more of the regions may differ from each other. For example, the stacked electronic display element may segment the image object such that some regions are much larger than others. For example, if the image object is of a room that only includes a flower in the foreground, the stacked electronic display element may segment an image object such that the absolute depth of the regions are smaller over the region describing the flower (i.e., more regions are describing the foreground), and larger for regions describing the background.

The stacked electronic display element assigns the regions to each of the electronic display panels, and the stacked electronic display panels emit image light corresponding, respectively, to their assigned region. Accordingly, each electronic display panel is emitting image light representative of particular slice of the image object over a range of depth values corresponding to its assigned region. Note, because each electronic display panel is emitting image light representative of a single region, energy consumption is generally comparable to energy consumption of a single electronic display panel presenting the entire image object.

As the electronic display panels do not occupy the same location, an aggregate image emitted by the stacked electronic display element has depth (i.e., the aggregate image being a 3-D image). A user could then focus throughout the 3D image rather than on a single image plane as would be typical in a conventional 2D display. Additionally, in some embodiments, the spacing between the electronic display panels may be increased to, e.g., better emphasize differences in depth between light emitted from different electronic display panels. For example, glass thicknesses may be increased on one or more of the electronic display elements, film thicknesses between electronic display panels increased, etc. Additionally, in some embodiments, a user may elect to have the stacked electronic display element present a "flat" 2D image. A difference from conventional 2D displays is that the stacked electronic display element may display an image using different panels—which can be used to increase the viewing comfort of a viewing user. For example, a viewing user watching a movie may instruct the stacked electronic display element to adjust the distance that the image appears from the viewing user to increase their viewing comfort of the movie.

Figure 6A:
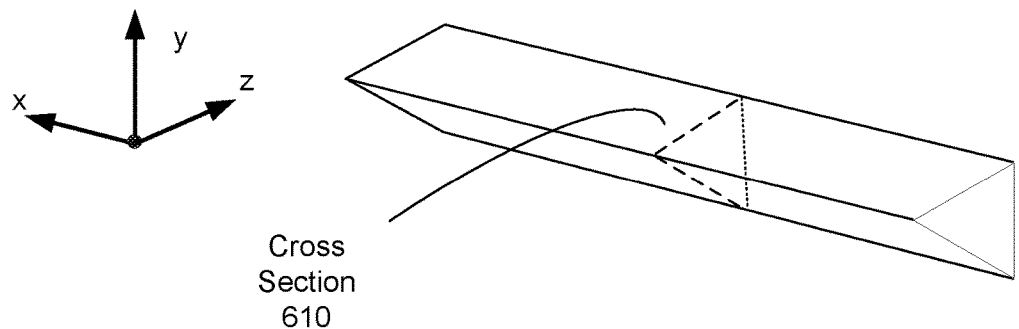
FIG. 6A is a perspective view of an example 3D image object, according to an embodiment.
Figure 6B:
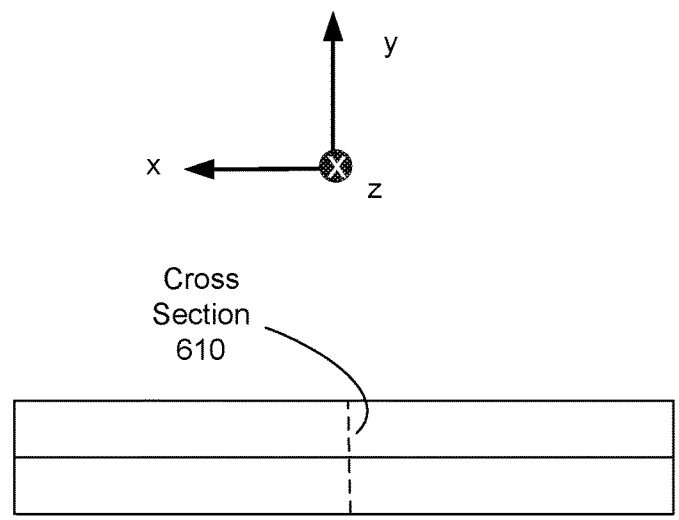
FIG. 6B is a cross section of the 3D image object in FIG. 6A, according to an embodiment.

FIG. 6A is a perspective view of an example an image object 600, according to an embodiment. The image object 600 is representative of an opaque 3D object to be presented by a stacked electronic display element. The image object 600 includes a cross section 610 which represents a slice in y-z plane of the image object 600. FIG. 6B is a cross section 620 of the image object 600 in FIG. 6A, according to an embodiment.

Figure 6C:
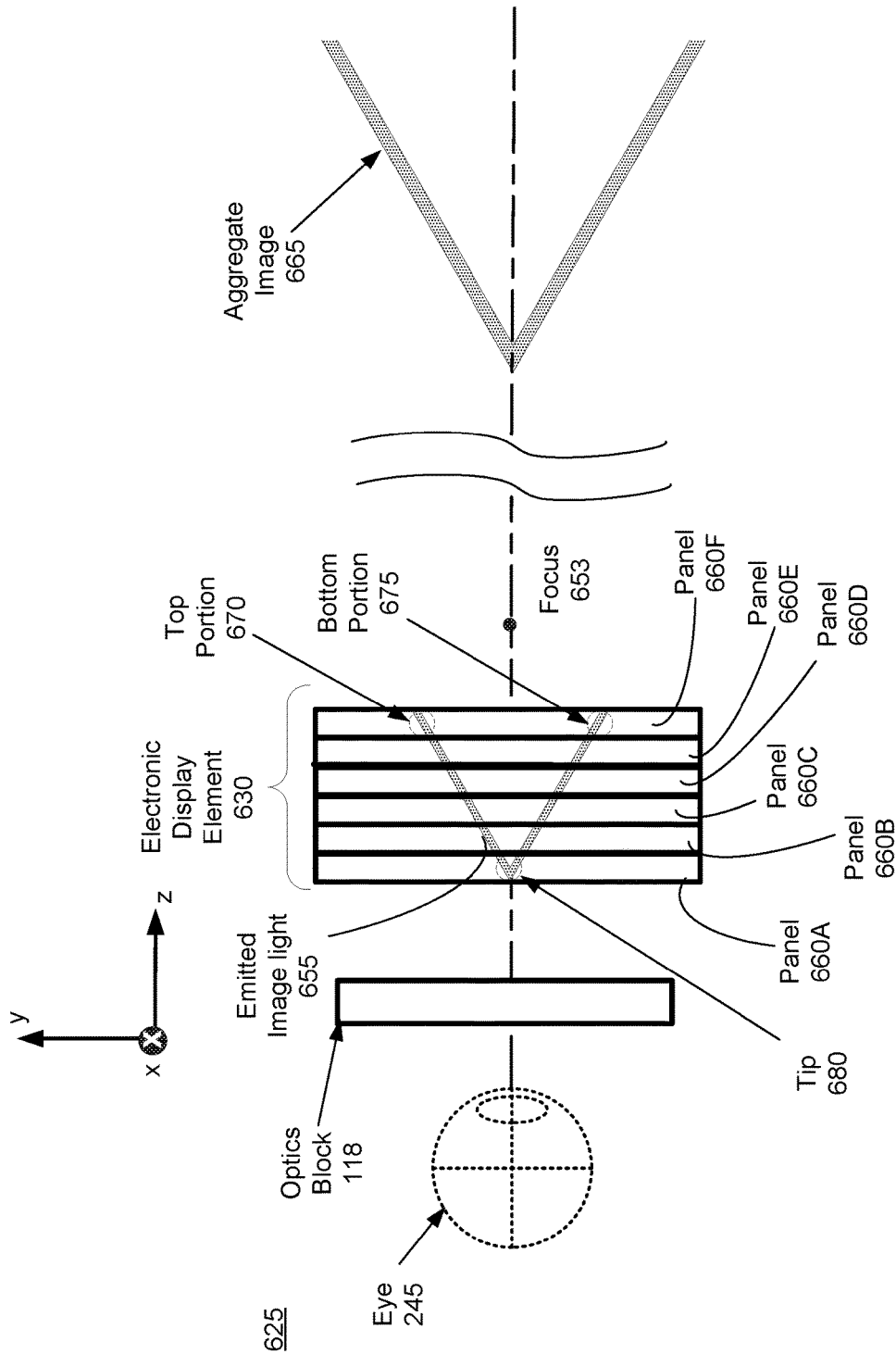
FIG. 6C is a diagram including a stacked electronic display element configured to operate as a 3D display, according to an embodiment.

FIG. 6C is a diagram 625 including a stacked electronic display element 630 configured to operate as a 3D display, according to an embodiment. In some embodiments, the stacked electronic display element 630 is part of the electronic display 115 of the VR headset 105 (e.g., stacked electronic display element 235). In other embodiments it is some other electronic display, e.g., a computer monitor, a television set, etc.

In this example, the stacked electronic element 630 includes six electronic display panels, specifically, electronic display panels 660A, 660B, 660C, 660D, 660E, and 660F. In some embodiments, the spacing between one or more of the electronic display panels 660 may vary to help emphasize a difference in depth in image light emitted from different electronic display panels 660. The stacked electronic display element 630 segments the image object 600 into 6 different segments. In this embodiment, each of regions has a same absolute depth.

Each of the electronic display panels 660A, 660B, 660C, 660D, 660E, and 660F emit image light corresponding to their assigned region. For example, the electronic display panel 660F emits image light representative of a top portion 670 and bottom portion 675 of the image object 600, accordingly the electronic display panel 660F does not present portions of the image object 600 that are assigned to different region (e.g., a tip 680 of the image object 600 that is emitted by the electronic display panel 660A). This partial usage of each electronic display element 660 helps minimize power consumption—such that total power consumption is comparable to a single electronic display element 660 presenting the entire image object 660.

The stacked electronic display element 630 is positioned inside a focus point 635 of the optics block 118. The optics block 118 has an effective focal length which is positive, accordingly, the stacked electronic stacked electronic display element 630 positioned inside the focus point 635 results in an aggregate image 665 that is virtual, erect, and appears farther away from an eye 245 of a user than the electronic display element 630. Note, as drawn in FIG. 6C, the portion of the image object 600 shown in the aggregate image 655 corresponds to the cross section 610 shown in FIGS. 6A, and 6B. However, this is merely an cross section of the total image, and if illustrated in its entirety the aggregate image 655 is a 3-D image of the image object 600.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A head-mounted display (HMD) comprising:
an electronic display element comprising a plurality of display panels that together output image light, the plurality of panels including a first display panel and a second display panel, the first display panel including a first plurality of sub-pixels, the first plurality of sub-pixels separated from each other by a non-emission area, the second display panel including a second plurality of sub-pixels, the second display panel positioned offset from the first display panel such that the second plurality of sub-pixels emit light through the non-emission area of the first display panel, wherein the first plurality of sub-pixels are configured to operate over a first range of luminosities, and the second plurality of sub-pixels are configured to operate over a second range of luminosities that is higher than the first range of luminosities, and the electronic display element is configured to:
receive an image having a dynamic range;
divide the dynamic range into "n" number of reduced dynamic ranges, wherein "n" is a number of display panels, and each reduced dynamic range corresponds to a different range of luminosities that different display panels are configured to operate over;
provide each display panel a respective reduced dynamic range;
display, by the first display panel, a first portion of the image in accordance with the first range of luminosities and a first reduced dynamic range;
display, by the second display panel, a second portion of image in accordance with the second range of luminosities and a second reduced dynamic range; and
an optics block configured to direct the image light to an exit pupil of the HMD corresponding to a location of an eye of a user of the HMD.

2. The HMD of claim 1, wherein the displayed first portion of the image and the displayed second portion of the image have a total contrast ratio that is at least 100,000:1.

3. The HMD of claim 1, wherein the electronic display panel further comprises a third display panel, the third display panel including a third plurality of sub-pixels, the third display panel positioned offset from the first display panel and the second display panel such that the third plurality of sub-pixels emit light through the non-emission area of the first display panel and the non-emission area of the second display panel, and the third plurality of sub-pixels operate over a third range of luminosities that is higher than the second range of luminosities, and the electronic display element is configured to:

display, by the third display panel, a third portion of the image in accordance with the third range of luminosities and a third reduced dynamic range.

4. The HMD of claim 1, wherein the first display panel and the second display panel are partially transparent to visible light.

5. The HIVID of claim 4, wherein the electronic display element is configured to:

receive image data describing an image object for presentation to a user as a 3D image;

determine a total depth of the image object using the image data;

segment the determined total depth of the image object into "n" different, successive, regions;

assign the regions to each of the electronic display panels, wherein a first region is assigned to the first display panel and a second region is assigned to the second display panel;

display, by the first display panel, the first region of the image; and display, by the second display panel, the second region of the image.

6. The HMD of claim 5, wherein each region has a same value of absolute depth, the absolute depth being the total depth of the image divided by "n."

7. The HMD of claim 5, wherein the first region is associated with a first depth and the second region is associated with a second depth that is different than the first depth.

8. The HMD of claim 1, wherein the electronic display panel further comprises an intermediate component, the intermediate component positioned between the first display panel and the second display panel such that light emitted from the second display panel passes through the intermediate component before passing through the first display panel.

9. The HMD of claim 8, wherein the intermediate component is selected from a group consisting of: a transparent electronic display panel, an attenuator, a polarizer, and diffractive element.

10. The HMD of claim 8, wherein a spacing between the intermediate component and the second display panel is different than a spacing between first display panel and the second display panel.

11. The HMD of claim 8, wherein the second display panel is opaque to the light emitted from the second plurality of pixels and the intermediate component and the first display panel are both at least partially transparent to the light emitted from the second plurality of pixels.

12. A head-mounted display (HMD) comprising:

an electronic display element comprising a plurality of display panels that together output image light, the plurality of panels including a first display panel and a second display panel, the first display panel including a first plurality of sub-pixels, the first plurality of sub-pixels separated from each other by a non-emission area, the second display panel including a second plurality of sub-pixels, the second display panel positioned offset from the first display panel such that the second plurality of sub-pixels emit light through the non-emission area of the first display panel, wherein the first plurality of sub-pixels are configured to operate over a first range of luminosities, and the second plurality of sub-pixels are configured to operate over a second range of luminosities that is higher than the first range of luminosities, and the electronic display element is configured to:

receive an image having a dynamic range;

divide the dynamic range into "n" number of reduced dynamic ranges, wherein "n" is a number of display panels, and each reduced dynamic range corresponds to a different range of luminosities that different display panels are configured to operate over;

provide each display panel a respective reduced dynamic range;

display, by the first display panel, a first portion of the image in accordance with the first range of luminosities and a first reduced dynamic range;

display, by the second display panel, a second portion of image in accordance with the second range of luminosities and a second reduced dynamic range; and an optics block configured to:

magnify the image light; and direct the image light to an exit pupil of the HMD corresponding to a location of an eye of a user of the HMD.

13. The HMD of claim 12, wherein the electronic display panel further comprises a third display panel, the third display panel including a third plurality of sub-pixels, the third display panel positioned offset from the first display panel and the second display panel such that the third plurality of sub-pixels emit light through the non-emission area of the first display panel and the non-emission area of the second display panel, and the third plurality of sub-pixels operate over a third range of luminosities that is higher than the second range of luminosities, and the electronic display element is configured to:

display, by the third display panel, a third portion of the image in accordance with the third range of luminosities and a third reduced dynamic range.

14. The HMD of claim 13, wherein the first display panel and the second display panel are partially transparent to visible light.

15. The HMD of claim 14, wherein the electronic display element is configured to:

receive image data describing an image object for presentation to a user as a 3D image;

determine a total depth of the image object using the image data;

segment the determined total depth of the image object into "n" different, successive, regions;

assign the regions to each of the electronic display panels, wherein a first region is assigned to the first display panel and a second region is assigned to the second display panel;

display, by the first display panel, the first region of the image; and display, by the second display panel, the second region of the image.

16. The HMD of claim 12, wherein the electronic display panel further comprises an intermediate component, the intermediate component positioned between the first display panel and the second display panel such that light emitted from the second display panel passes through the intermediate component before passing through the first display panel.

17. A head-mounted display (HMD) comprising:

an electronic display element comprising a plurality of display panels that together output image light, the plurality of panels including a first display panel and a second display panel, the first display panel including a first plurality of sub-pixels, the first plurality of sub-pixels separated from each other by a non-emission area, the second display panel including a second plurality of sub-pixels, the second display panel positioned offset from the first display panel such that the second plurality of sub-pixels emit light through the non-emission area of the first display panel, wherein the first plurality of sub-pixels are configured to operate over a first range of luminosities, and the second plurality of sub-pixels are configured to operate over a second range of luminosities that is higher than the first range of luminosities, and the electronic display element is configured to:

receive an image having a dynamic range;

divide the dynamic range into "n" number of reduced dynamic ranges, wherein "n" is a number of display panels, and each reduced dynamic range corresponds to a different range of luminosities that different display panels are configured to operate over;

provide each display panel a respective reduced dynamic range;

display, by the first display panel, a first portion of the image in accordance with the first range of luminosities and a first reduced dynamic range;

display, by the second display panel, a second portion of image in accordance with the second range of luminosities and a second reduced dynamic range; and an optics block configured to:

correct one or more optical aberrations in the image light;

magnify the image light; and direct the image light to an exit pupil of the HMD corresponding to a location of an eye of a user of the HMD.

\* \* \* \* \*

UNITED STATES PATENT AND TRADEMARK OFFICE
CERTIFICATE OF CORRECTION

PATENT NO. : 10,274,728 B2
APPLICATION NO. : 15/158365
DATED : April 30, 2019
INVENTOR(S) : Evan M. Richards, Shizhe Shen and Atman Jacob Binstock Page 1 of 1

It is certified that error appears in the above-identified patent and that said Letters Patent is hereby corrected as shown below:

In the Claims

Column 15, Line 11, In Claim 5, delete "HIVID" and insert --HMD-- therefor

Signed and Sealed this
Twenty-second Day of October, 2019

Andrei Iancu
*Director of the United States Patent and Trademark Office*